United States Patent [19]

Kallin et al.

[11] Patent Number: 5,257,399
[45] Date of Patent: Oct. 26, 1993

[54] MULTIPLE ACCESS HANDLING IN A CELLULAR COMMUNICATIONS SYSTEM

[75] Inventors: Harald Kallin, Sollentuna; Roland Bodin, Spånga, both of Sweden

[73] Assignee: Telefonaktiebolaget L M Ericsson, Stockholm, Sweden

[21] Appl. No.: 618,963

[22] Filed: Nov. 28, 1990

[51] Int. Cl.⁵ .............................................. H04Q 7/00
[52] U.S. Cl. ................................. 455/33.1; 455/56.1; 379/59
[58] Field of Search ............... 455/33, 54, 56, 67, 455/53, 33.1, 33.4, 54.1, 56.1, 53.1, 67.1; 379/59, 60, 63

[56] References Cited

U.S. PATENT DOCUMENTS

| | | | |
|---|---|---|---|
| 4,144,412 | 3/1979 | Ito et al. | 179/2 EB |
| 4,481,670 | 11/1984 | Freeburg | 455/33 |
| 4,531,235 | 7/1985 | Brusen | 455/273 |
| 4,545,071 | 10/1985 | Freeburg | 455/33 |
| 4,549,311 | 10/1985 | McLaughlin | 455/277 |
| 4,550,443 | 10/1985 | Freeburg | 455/33 |
| 4,619,002 | 10/1986 | Thro | 455/226 |
| 4,670,905 | 6/1987 | Sandvos et al. | 455/33 |
| 4,726,050 | 2/1988 | Menich et al. | 379/60 |
| 4,765,753 | 8/1988 | Schmidt | 455/33 |
| 4,815,073 | 3/1989 | Grauel et al. | 370/95 |
| 4,856,048 | 8/1989 | Yamamoto et al. | 379/60 |
| 4,912,756 | 3/1990 | Hop | 379/60 |
| 5,008,953 | 4/1991 | Dahlin et al. | 379/60 |
| 5,042,082 | 8/1991 | Dahlin | 379/60 |

FOREIGN PATENT DOCUMENTS

| | | |
|---|---|---|
| 0283683 | 9/1988 | European Pat. Off. . |
| 2338611 | 8/1977 | France . |
| 2211699 | 7/1989 | United Kingdom . |

Primary Examiner—Reinhard J. Eisenzopf
Assistant Examiner—Edward Urban
Attorney, Agent, or Firm—Burns, Doane, Swecker & Mathis

[57] ABSTRACT

A method and apparatus for use in a cellular mobile radio telephone system for determining which of one of several mobile generated transmissions received in a mobile switching center, sent from the same mobile station via more than one base station, should be accepted. A determination is made based on the relative signal strengths of the signals received by the base stations and by the relative time of occurrence of the mobile generated transmissions.

28 Claims, 10 Drawing Sheets

MULTIPLE ACCESS HANDLING IN A CELLULAR COMMUNICATIONS SYSTEM

FIELD OF THE INVENTION

The present invention relates to cellular mobile radio systems. More particularly, the present invention is directed to a method and apparatus for processing access requests, paging responses, or registration accesses from mobile stations to base stations in such a way as to eliminate erroneous processing which may occur under certain conditions. Such conditions include the situation that arises when base stations not intended to handle a particular access or paging response overhear the particular access or paging response and report it to the mobile switching center.

BACKGROUND OF THE INVENTION

A typical cellular mobile radio telephone system consists of at least one mobile switching center (also known as a mobile telephone switching office), at least one base station, and at least one mobile station. The mobile switching center constitutes an interface between the radio system and the public switching telephone network. The base station transmits information between the mobile stations and the mobile switching center. Calls to and from mobile subscribers are switched by the mobile switching center. The mobile switching center also provides all signalling functions needed to establish the calls.

In order to obtain radio coverage of a geographical area, a number of base stations are normally required. This number may range from, in the exceptional case, one base station, and up to one hundred or more base stations in normal systems. The area is divided into cells, where each cell may either be serviced by a base station or may share a base station with a number of the other cells. Each cell has an associated control channel over which control (non-voice) information is communicated between the mobile units in that cell and the base station. Generally speaking, the control channel includes a dedicated channel at a known frequency over which certain information is communicated from the base station to mobile stations, a paging channel for unidirectional transmissions of information from the base station to the mobile stations, and an access channel for bidirectional communications between the mobile stations and the base station. These various channels may share the same frequency, or they may operate at different respective frequencies.

Each mobile station is assigned to one mobile switching center or home location register. The home location register is a database which contains information about all its assigned subscribers and where they are in the network. The home location register can be a stand-alone intelligent processor connected to one or more mobile switching centers or it can be part of a mobile switching center, possibly connected to one or more other mobile switching centers. When a mobile station enters a second mobile switching center service area to which it is not assigned, the new exchange is regarded as a visited exchange, and the subscriber as a visiting subscriber. Calls are now routed to and switched in this second mobile switching center.

Three types of transmissions normally take place on the control channels between the mobile stations and the base station, although other types are possible, such as an audit request and response, or order confirmation. First, when a mobile station is originating a call, it sends an access request to the base station the control channel of which has the strongest or second strongest signal. This access request serves to inform the base station that the requesting mobile needs to be assigned a voice channel over which the call can be connected. Second, when a mobile station is paged by a base station, indicating that the base station has a call to be completed to the mobile subscriber, the paged mobile station sends back a paging response on the access channel. Finally, when a mobile station travels from one cell to another, or for other reasons, the mobile station may send a registration access to identify itself and its presence to the telephone exchange associated with the cell.

An originating call access or a paging response is performed as follows. The mobile station scans the control channels of surrounding base stations and selects the one with the strongest or second strongest signal over which to make the access. The mobile station then performs the access by sending a transmission on the reverse control channel to the associated base station. The associated base station then passes the access or paging response to its mobile switching center.

A registration access is performed in cellular systems as follows. A registration access is an access requested by a mobile station to identify itself to a base station as being active in the system at the time the message is sent to the base station. The registration access may be requested for a number of reasons, for example: the mobile is switched on; the mobile determines that the time elapsed since the last registration has passed a specified limit; or the mobile detects a different system or area identification (SID or AID). The mobile then scans the control channels of surrounding base stations, and selects the one with the strongest or second strongest signal on which to complete the registration access, as explained above regarding call origination. The associated base station then passes the registration access to its mobile switching center.

For simplicity in the following discussion, an access request, paging response, and registration access of the type described above may be referred to as a mobile generated transmission when the discussion pertains to all three types.

Due to unfavorable (low) attenuation between remote base stations and mobile stations, it is possible that two or more base stations will receive a mobile generated transmission while only one base station is actually the intended recipient. In other words, it is possible that a mobile generated transmission which is intended for a given base station may be overheard by another base station operating on the same, or an adjacent, frequency. The risk of this increases as the number of cells, or base stations, in a given region increases to handle the increasing number of mobile stations.

Normally, protection codes are used which prevent the second base station from inadvertently overhearing the mobile generated transmission. However, there is only a small number of unique codes. Therefore, there is a good chance that various base stations may overhear mobile generated transmissions which are intended for other base stations. Conventional base stations are not capable of reliably determining whether such transmissions are actually intended for themselves or for other base stations.

In such cases, each of the base stations will try to act on the transmission received from the mobile station and will therefore notify the mobile switching center of a mobile generated transmission. Because two or more such transmissions are thus sent to the mobile switching center, the mobile switching center cannot accurately determine which of the mobile generated transmissions to accept and further process. Processing the mobile generated transmission received first in time is not necessarily correct because the transmission from the base station which was not intended to receive the mobile generated transmission may reach the mobile switching center first.

In one known system described in U.S. Pat. No. 4,481,670 to Freeburg, where more than one channel communication modules CCM receives an access request from a mobile, a general communications controller GCC is called upon to determine which CCM to use as the primary station. In this system described in this patent, the area is divided into seven zones, where each zone is covered by one or more transmitter/receiver pair. Each time a mobile transmits, signal strength readings are taken by each receiver hearing the transmission. These readings are used to compute an adjusted signal strength for each zone by multiplying the measured signal strengths for each zone by preselected factors associated with the particular zone. The GCC then selects the zone which has the largest adjusted signal strength for a particular transmission from the mobile as being the zone in which the mobile is most likely located. The selected zone is then stored for later reference when it becomes necessary to locate the mobile.

Whenever a message signal together with an average signal strength measurement is received by the GCC from a CCM, a message timer is set to provide a time interval during which the same message signal is received by other CCM's and sent together with an average signal strength measurement to the GCC. All signals from other CCM's received within the set time period are used to determine where the mobile is located. Thus, the location of each mobile is updated each time a message signal is received by the CCMs. Then, when it is desired to transmit a message signal for the GCC to a selected mobile, the most recently determined location is used as a first try for successful connection.

According to this patented method, the system described in the patent appears to be one in which adjacent CCM's operate on the same frequencies, thus permitting adjacent CCM's to hear the same message from a mobile. Further, only the largest adjusted signal strength is used, with no provision for the possibility that two signal strengths may be so close as to preclude an accurate determination. Finally, by multiplying the signal strength measurements by predetermined factors, inaccurate determinations of locations are possible.

In some conventional systems, the mobile switching center automatically starts processing of the first mobile generated transmission. However, in certain circumstances, this may not be appropriate and may result in lost calls. For example, consider the case when a mobile station makes an access in a network where adjacent base stations operate on different frequencies. Because the receivers in the control channels are not normally receiving any informative signals, distant control channel picks up a weak whisper of this access from far away. The base station with which this distant control channel is associated then sends this weak access to the mobile switching center. The weak access, because it occurs first in time is processed. Thereafter, if the intended base station forwards the access request it has received, the call is lost because the mobile switching center has reacted to the first received request and therefore ignores the second.

SUMMARY OF THE INVENTION

In order to overcome the disadvantages noted with conventional systems, the present invention is directed to a method for use in a cellular radio telephone system for determining which transmission, received by a mobile switching center from at least two base stations receiving a single mobile initiated transmission should be accepted by the mobile switching center, the method including the steps of, measuring the signal strength of the received mobile generated transmission, sending the mobile generated transmission and the measured signal strength of the mobile generated transmission to a processing means from the at least two base stations, storing in a memory the respective mobile generated transmissions and measured signal strengths received from the at least two base stations within a predetermined time period, and determining which of the mobile generated transmissions to accept based on time of receipt by the processing means and the stored signal strengths of the mobile generated transmissions. The step of determining comprises the steps of adding a stored compensation value to each of the measured signal strengths received from the at least two base stations to determine compensated signal strengths, the compensation value being stored relative to each pair of base stations of the at least two base stations, comparing the compensated signal strengths to yield a difference value, if the difference value exceeds a predetermined threshold, accepting the mobile generated transmission having the strongest relative signal strength, and if the difference value is below the predetermined threshold, accepting one of the received mobile generated transmissions according to a predetermined priority order.

According to another preferred embodiment of the present invention, a method of selecting one of several access requests received during operation of a cellular mobile radio system for processing by a mobile switching center is provided, the method comprising the steps of processing the mobile generated transmission received first from one of the base stations, storing the identification of the base station from which the processed mobile generated transmission originated and the signal strength of the processed mobile generated transmission, comparing the signal strength of a subsequent mobile generated transmission received from another base station to the signal strength of the processed mobile generated transmission to yield a difference value, obtaining a compensated difference value by adding a compensation value stored relative to the base stations from which the processed mobile generated transmission and the subsequent mobile generated transmission are received, when the compensated difference value is greater than or equal to a predetermined threshold amount, terminating the processed mobile generated transmission, processing the subsequent mobile generated transmission having the greater signal strength, and storing the identification of the base station from which the subsequent processed mobile generated transmission originated and the signal strength of the subsequent processed mobile generated transmission, and repeating the comparing, terminating and subsequent processing and storing steps for further mobile generated transmissions received during a set time period.

According to another preferred embodiment of the present invention, a method is provided for use in a cellular radio telephone system for determining which mobile generated transmission, received by a processing means from at least two base stations receiving a single mobile generated transmission, should be accepted by the processing means, the method comprising the steps of, (a) in the mobile station:
(1) scanning a plurality of control channels over which messages are broadcast by a plurality of base stations to determine relative signal strengths of the messages,
(2) sending a mobile generated transmission over a selected one of said plurality of control channels, the mobile generated transmission being received by the at least two base stations, (b) in the at least two base stations:
(1) measuring the signal strength of the received mobile generated transmission,
(2) sending the mobile generated transmission and the measured signal strength of the received mobile generated transmission to the processing means, (c) in the processing means;
(1) storing in a memory the respective mobile generated transmissions and measured signal strengths received from the at least two base stations within a predetermined period of time, and
(2) determining which or the received mobile generated transmissions to accept based on the time of receipt in the processing means and the relative signal strengths of the mobile generated transmissions.

The step of determining comprises the steps of adding a stored compensation value to each of the measured signal strengths received from the at least two base stations to determine compensated signal strengths, the compensation value being stored relative to each pair of base stations of the at least two base stations, comparing the compensated signal strengths to yield a difference value, if the difference value exceeds a predetermined threshold, accepting the mobile generated transmission having the strongest relative signal strength, and if the difference value is below the predetermined threshold, accepting one of the received mobile generated transmissions according to a predetermined priority order.

According to a preferred embodiment of the invention, a system is provided for processing multiple mobile generated transmissions in a cellular system the cellular system having at least one mobile unit, at least two base stations and at least one processing means. The system comprises means provided in the mobile unit for scanning signals transmitted by such base stations on at least one base to mobile control channel and selecting one of the base stations for access, means provided in the mobile unit for transmitting the mobile generated transmissions over a control channel of the selected base station, means provided in the at least two base stations for receiving the transmitted mobile generated transmission and for sending the received mobile generated transmissions to the processing means, and means provided in the processing means for selecting one of several mobile generated transmissions received from at least two base stations for processing based on the time of receipt of the mobile generated transmission and the relative signal strength of the mobile to base signal associated with the mobile generated transmissions, the means for selecting comprising memory means for storing the mobile generated transmissions which occur within a predetermined time period, identities of the mobile stations sending the mobile generated transmissions, signal strength of the mobile generated transmissions measured at the time of receipt of the mobile generated transmission by the respective base stations.

BRIEF DESCRIPTION OF THE DRAWINGS

The present invention will now be described in more detail with reference to the preferred embodiments of the device, given only by way of example, and with reference to the accompanying drawings, in which.

GENERAL DESCRIPTION OF THE PREFERRED EMBODIMENTS

The present invention is applicable to the following situations. During initial setup of a communication between a mobile station and another mobile station or a telephone network, i.e., the mobile subscriber wants to place a call, the mobile station sends out an access request over a control channel of the closest base station. Additionally, when a mobile unit is being paged, i.e., the mobile unit is being sought when an incoming call is received by the base station, the mobile unit generates a paging response. Further, a mobile station may send a registration access when a predetermined time period has elapsed since the last registration access, or may send a registration access when the mobile station moves into a new cell. As stated above, the access request, paging response and registration access will be termed mobile generated transmissions for purposes of the following discussion.

In certain cases, it is possible that these mobile generated transmission could be overheard by not only the intended base station, but by another base station or stations operating on the same or an adjacent channel or frequency. Each of the base stations receiving the mobile generated transmission will automatically process the mobile generated transmission by transmitting it to the mobile switching center. Additionally, it is possible that more than one mobile switching center will hear the transmissions from the base stations. In the former situation, the mobile switching center must make a choice as to which mobile generated transmission from the different base stations should be accepted. In the latter situation, a home location register must make the choice.

The present invention is directed to methods for determining which of the received mobile generated transmissions is the proper one.

When a mobile generated transmission appears in more than one base station, these transmissions will be detected all within a few milliseconds or one another in the various base stations. Both, or all, base stations will try to act on the transmission received from the mobile station by immediately notifying the mobile switching center. In order to make a comparison between mobile generated transmissions in the different base stations, all the mobile generated transmissions received within a given relatively short period of time are stored to allow for other base stations to report their mobile generated transmissions. The relative signal strengths of the mobile generated transmissions are compared to determine which of them is to be accepted.

DETAILED DESCRIPTION OF THE PREFERRED EMBODIMENTS

Figure 1:
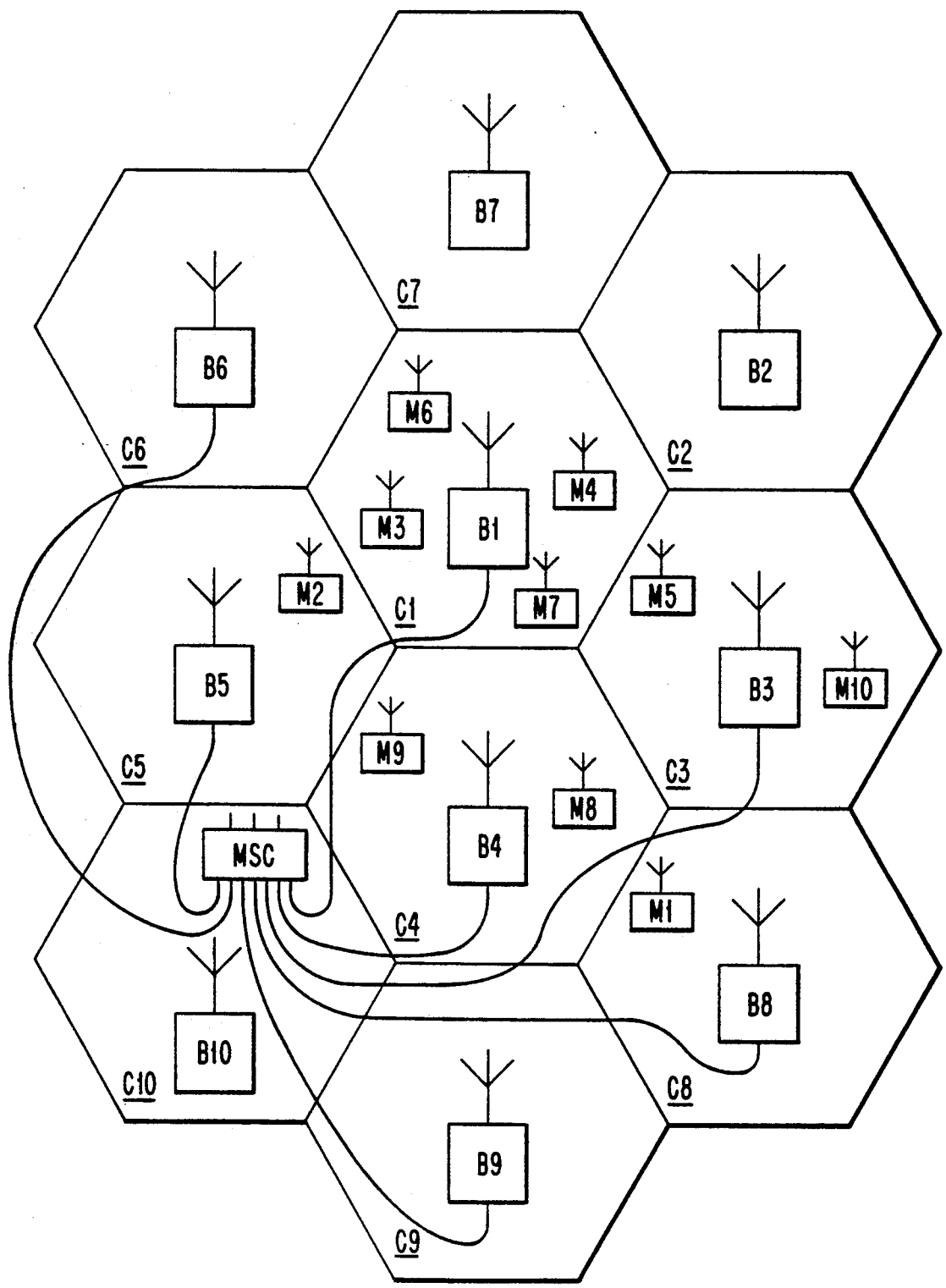
FIG. 1 is a schematic diagram illustrating an example cellular mobile radio system illustrating the relationship of the system's cells, a mobile switching center, base stations and mobile stations.

FIG. 1 is a schematic diagram illustrating ten cells, C1 to C10, in a cellular mobile radio system. Normally the method according to the present invention would be implemented in a cellular mobile radio system comprising many more cells than ten. For purposes of this discussion, the system depicted herein is considered to be an isolated piece of a larger system which has been fragmented.

For each cell C1 to C10, there is a respective base station B1 to B10. FIG. 1 illustrates base stations situated in the vicinity of cell center and having omni-directional antennas. The base stations of adjacent cells may however be collocated in the vicinity of cell borders and have directional antennas.

FIG. 1 also illustrates ten mobile stations, M1 to M10, which are movable within a cell and from one cell to another cell. The method according to the present invention may be implemented in a cellular mobile radio system comprising many more mobile stations than ten. In particular, there are normally many more mobile stations than there are base stations.

Also illustrated in FIG. 1 is a mobile switching center. The mobile switching center MSC illustrated in FIG. 1 is connected to all ten illustrated base stations by cables. The mobile switching center is connected by cables also to a fixed public switching telephone network or similar fixed network with ISDN facilities. All cables from the mobile switching center to base stations and cables to the fixed network are not illustrated. Further, other means may be used instead of cables for base to mobile switching center communications, e.g., fixed radio links.

The cellular mobile radio system illustrated in FIG. 1 includes a plurality of radio channels for communication. The system is designed both for analog information, e.g., speech, digitized analog information, e.g., digitized speech, and pure digital information, e.g., pure digital data. In the context of the present invention, the term connection is used for a communication channel between two telephones or terminals where at least one of the telephones or terminals may be using a radio/cellular system. Thus a connection may be a call where two people talk to each other, but may also be a data communication channel where computers exchange data.

Each cellular system is assigned a particular frequency band on which it can operate. A set of communication channels is allocated to each cell. For example, between 10 and 30 different voice channels and 1 control channel may be allocated to any given cell. Different sets of communication channels must always be allocated to neighboring cells, since in order to maintain full radio coverage, cells overlap each other. Using the same channels would cause co-channel interference in these overlapping areas.

Figure 2:
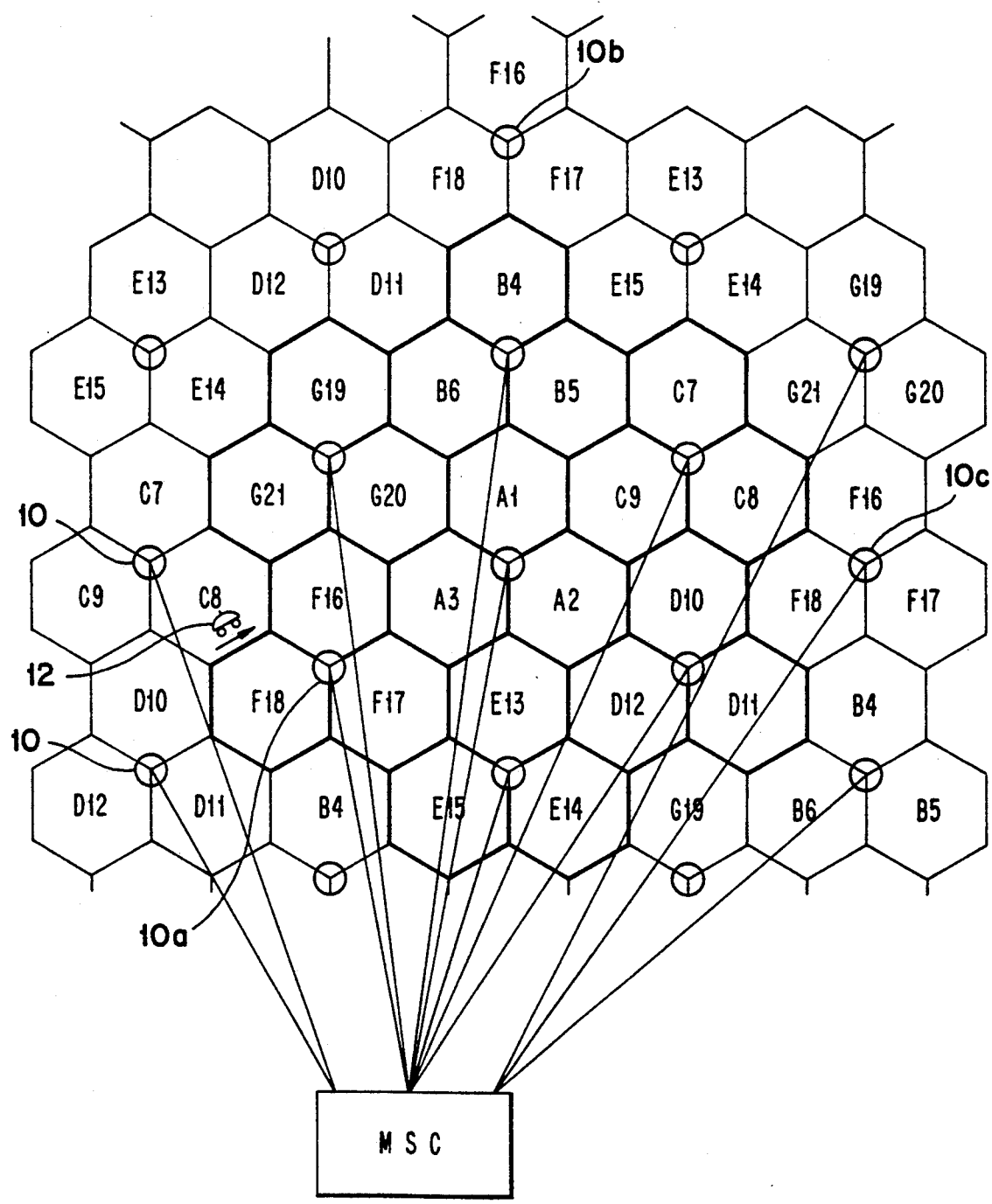
FIG. 2 is a schematic diagram illustrating a number of clusters of 21 cells each, many cells being connected to the same mobile switching center.

A group of neighboring cells using all the unique channels available in the system frequency band is called a cluster of cells. In other words, there is no frequency reuse in a cluster. FIG. 2 illustrates an example of a cluster pattern which is commonly used in mobile cellular telephone systems. For example, in the pattern of FIG. 2, a cluster of 21 cells is shown in thick lines. For illustration purposes, the letters used in the cell identification identify cells assigned to a common base station, while the numbers identify the cell number in the cluster and the frequencies assigned to the cell. Thus, cells in different clusters with the same numbers and letters transmit over the same frequencies. In the example shown in FIG. 2, the base stations 10 each serve three cells and are provided with directional antennas. It is also possible that each cell includes its own base station formed by an omni-directional antenna.

Figure 3:
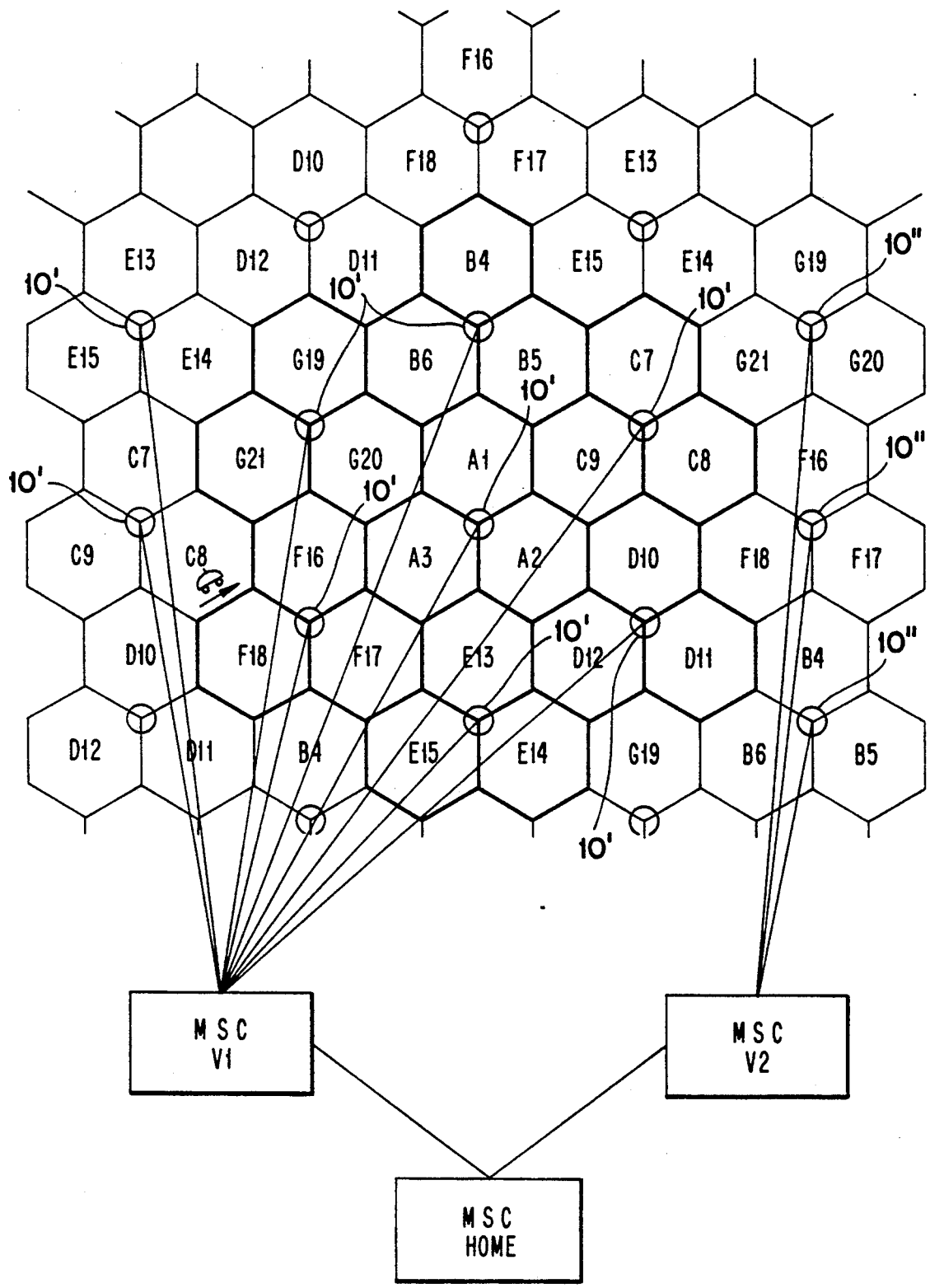
FIG. 3 is a schematic diagram illustrating a number of clusters of 21 cells each, a number of the cells being connected to one mobile switching center and another number of the cells being connected to a second mobile switching center, these two mobile switching centers being connected to a home mobile switching center.

It is not necessary that complete clusters be associated with the same mobile switching center. FIG. 3 shows an example of several clusters of 21 cells each. Base stations 10' are connected to mobile switching center MSC V1, and base stations 10'' are connected to a second mobile switching center MSC V2. These two mobile switching centers are in turn connected to a home location register/mobile switching center MSC HOME. The home location register/mobile switching center MSC HOME stores the record of the location of the mobile stations.

Each mobile station is identified by a unique mobile station number. This mobile station number is sent by the mobile station to the base station and then to the mobile switching center. This number is also used by the mobile switching center during the paging of a mobile station. Each base station can also be identified by a digital color code. The digital color code is transmitted by the mobile station on a radio channel used for digital radio channels and serves to identify to the base station which base station transmitter the mobile station is receiving.

Figure 4:
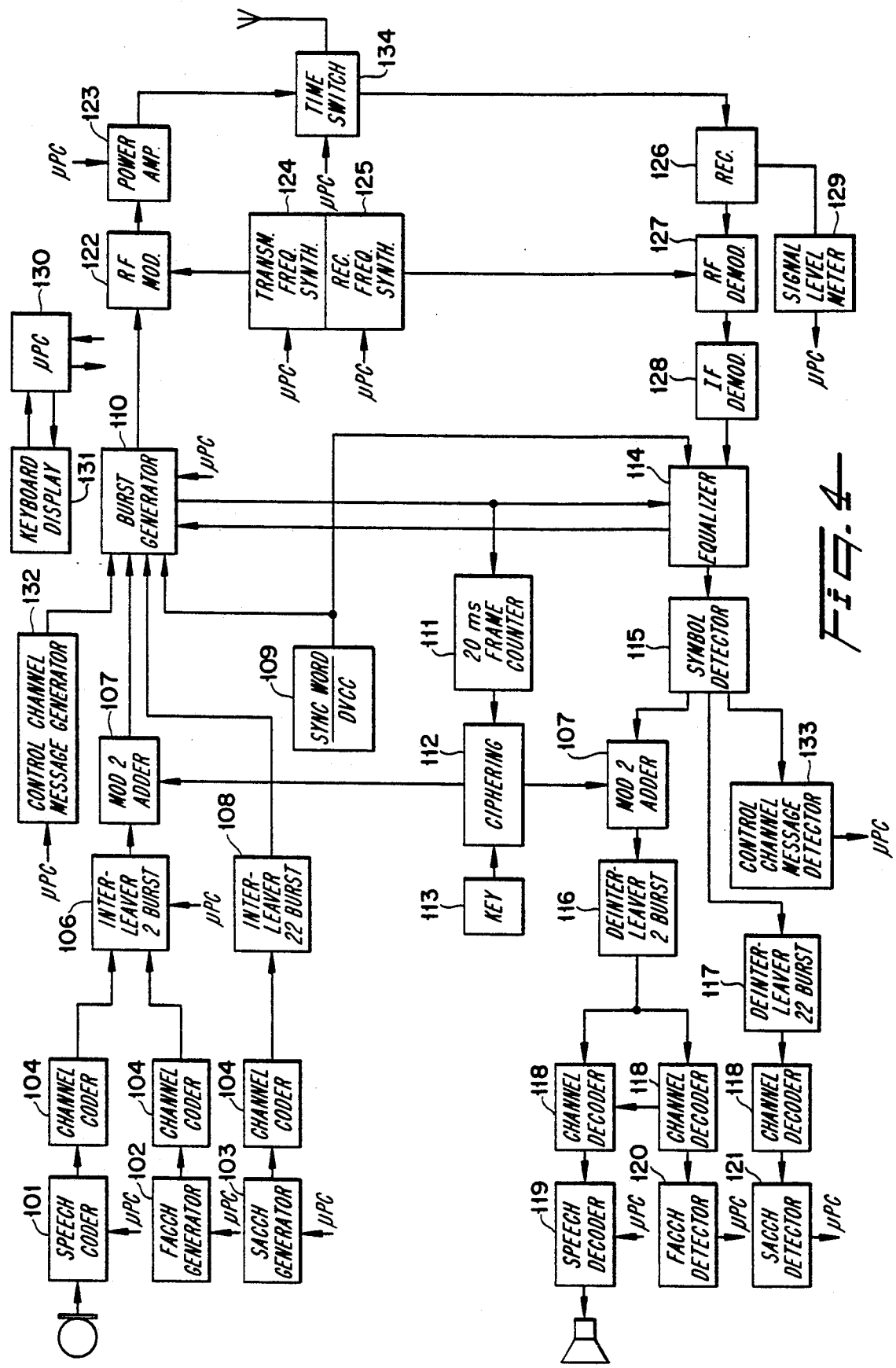
FIG. 4 is a block diagram illustrating a mobile station in a cellular mobile radio system according to FIG. 1.

Referring now to FIG. 4, an embodiment of a mobile station that can be utilized in a cellular telephone system that operates in accordance with the present invention is illustrated. This particular example pertains to a mobile station that can be used in a digital communications system, i.e., one in which digitized voice information is transmitted between base and mobile stations. Furthermore, the operation of the system is explained in the context of full-rate transmissions, in which each packet of digital information is interleaved over two spaced time slots in a frame of data. It will be readily appreciated, however, that the invention is equally applicable to other types of cellular radio systems, such as those in which information is transmitted in an analog format or transmitted digitally at a half rate.

In the mobile station depicted in FIG. 4, a speech coder 101 converts the analog signal generated by microphone into a binary data stream. The data stream is then divided into data packets, according to the TDMA principle. A fast associated control channel (FACCH) generator 102 generates control and supervision signalling messages that are transmitted from the mobile station to the land-based system. The FACCH message replaces a user frame (speech/data) whenever it is to be transmitted. A slow associated control channel (SACCH) generator 103 provides signalling messages that are transmitted over a continuous channel for the exchange of information between the base station and the mobile station and vice-versa. A fixed number of bits, e.g. twelve, is allocated to the SACCH for each time slot of a message train. Channel coders 104 are respectively connected to the speech coder 101, FACCH generator 102, and SACCH generator 103 for manipulating the incoming data in order to carry out error detection and correction. The techniques used by the channel coders 104 are preferably convolutional encoding, which protects important data bits in the speech code, and cyclic redundancy check (CRC), wherein the perceptually significant bits in the speech coder frame, e.g. twelve bits, are used for computing a seven-bit check.

A two-burst interleaver 106 is connected to the channel coder 104 associated with the speech coder 101 and the FACCH generator 102, respectively. The two-burst interleaver 106 is controlled by a microprocessor controller 130 so that, at appropriate times, user information over a particular speech channel is replaced with system supervision messages over the FACCH. Data to be transmitted by the mobile station is interleaved over two distinct time slots. A packet of 260 data bits, which constitute one transmitting word, are divided into two equal parts and are interleaved over two different time slots. The effects of RAYLEIGH fading is reduced in this manner. The output of the two-burst interleaver 106 is provided to the input of a modulo-two adder 107 so that the transmitted data is ciphered bit-by-bit by logical modulo-two-addition of a pseudo-random bit stream.

The output of the channel coder 104 associated with the SACCH generator 103 is connected to a 22-burst interleaver 108. The 22-burst interleaver 108 interleaves data transmitted over the SACCH over 22 time slots each consisting of 12 bits of information.

The mobile station further includes a Sync Word/DVCC generator 109 for providing the appropriate synchronization word (Sync Word) and DVCC (digital verification color code) which are to be associated with a particular connection. The Sync Word is a 28-bit word used for time slot synchronization and identification. The DVCC is an 8-bit code which is sent by the base station to the mobile station and vice-versa, for assuring that the proper channel is being decoded.

A burst generator 110 generates message bursts for transmission by the mobile station. The burst generator 110 is connected to the outputs of the modulo-two-adder 107, the 22-burst interleaver 108, the Sync Word/DVCC generator 109, an equalizer 114, and a control channel message generator 132, to integrate the various pieces of information from these respective units into a single message burst. For example, according to the published U.S. standard EIA/TIA 15-54, a message burst comprises data (260 bits), SACCH (12 bits), Sync Word (28 bits), coded DVCC (12 bits), and 12 delimiter bits, combined for a total of 324 bits. Under the control of the microprocessor 130, two different types of message bursts are generated by the burst generator 110: control channel message bursts from the control channel message generator 132 and voice/traffic message bursts. The control channel message replaced the SACCH as well as the speech data normally generated in a voice/traffic burst.

The transmission of a burst, which is equivalent to one time slot, is synchronized with the transmission of other time slots, which together make up a frame of information. For example, under the U.S standard, a frame comprises three full-rate time slots. The transmission of each burst is adjusted according to timing control provided by the equalizer 114. Due to time dispersion, an adaptive equalization method is provided in order to improve signal quality. For further information regarding adaptive equalization techniques, reference is made to U.S. patent application Ser. No. 315,561, filed Feb. 27, 1989, and assigned to the same assignee. Briefly, the base station functions as the master and the mobile station is the slave with respect to frame timing. The equalizer 114 detects the timing of an incoming bit stream from the base station and synchronizes the burst generator 110. The equalizer 114 is also operable for checking the Sync Word and DVCC for identification purposes.

A frame counter 111 is coupled to the burst generator 110 and the equalizer 114. The frame counter 111 updates a ciphering code utilized by the mobile station for each transmitted frame, e.g.. once every 20 ms. A ciphering unit 112 is provided for generating the ciphering code utilized by the mobile station. A pseudo random algorithm is preferably utilized. The ciphering unit 112 is controlled by a key 113 which is unique for each subscriber. The ciphering unit 112 consists of a sequencer which updates the ciphering code.

The burst produced by the burst generator 110, which is to be transmitted, is forwarded to an RF modulator 122 The RF modulator 122 is operable for modulating a carrier frequency according to the $\pi/4$-DQPSK method ($\pi/4$ shifted, Differentially encoded Quadrature Phase Shift Keying). The use of this technique implies that the information is differentially encoded, i.e., 2-bit symbols are transmitted as four possible changes in phase: $\pm\pi/4$ and $\pm 3\pi/4$. The transmitter carrier frequency supplied to the RF modulator 122 is generated by a transmitting frequency synthesizer 124 in accordance with the selected transmitting channel. Before the modulated carrier is transmitted by an antenna, the carrier is amplified by a power amplifier 123. The RF power emission level of the amplifier is selected on command by a microprocessor controller 130. The amplified signal is passed through a time switch 134 before it reaches the antenna. The timing is synchronized to the transmitting sequence by the microprocessor controller 130.

A receiver carrier frequency signal is generated in accordance with the selected receiving channel by a receiving frequency synthesizer 125. Incoming radio frequency signals are received by a receiver 126, after passing through the time switch 134. The timing is synchronized to the receiving sequence by the microprocessor controller 130. The strength of the received signals are measured by a signal level meter 129. The received signal strength value is then sent to the microprocessor controller 130. An RF demodulator 127, which receives the receiver carrier frequency signal from the receiving frequency synthesizer 125 and the radio frequency signal from the receiver 126, demodulates the radio frequency carrier signal, thus generating an intermediate frequency. The intermediate frequency signal is then demodulated by an IF demodulator 128 which restores the original $\pi/4$-DQPSK - modulated digital information.

The restored digital information provided by the IF demodulator 128 is supplied to the equalizer 114. A symbol detector 115 converts the received two-bit symbol format of the digital data from the equalizer 114 to a single-bit data stream. The symbol detector 115 in turn produces three distinct output signals. Control channel messages are sent to a control message detector 133 which supplies detected control channel information to the microprocessor controller 130. Any speech data/FACCH data is supplied to a modulo-two adder 107 and a two-burst deinterleaver 116. The speech data/FACCH data is reconstructed by these components by assembling and rearranging information from two time slots of the received data. The symbol detector 115 supplies SACCH data to a 22-burst deinterleaver 117. The 22-burst deinterleaver 117 reassembles and rearranges the SACCH data, which is spread over 22 consecutive frames.

The two-burst deinterleaver 116 provides the speech data/FACCH data to two channel decoders 118. The convolutionally encoded data is decoded using the reverse of the above-mentioned coding principle. The received cyclic redundancy check (CRC) bits are checked to determine if any error has occurred. The FACCH channel coder furthermore detects the distinction between the speech channel and any FACCH information, and directs the decoders accordingly. A speech decoder 119 processes the received speech data from the channel decoder 118 in accordance with a speech coder algorithm (e.g., VSELP), and generates the received speech signal The analog signal is finally enhanced by a filtering technique. Messages on the fast associated control channel are detected by a FACCH detector 120, and the information is transferred to the microprocessor controller 130.

The output of the 22-burst deinterleaver 117 is provided to a separate channel decoder 118. Messages on the slow associated control channel are detected by a SACCH detector 121, and that information is transferred to the microprocessor controller 130.

The microprocessor controller 130 controls the mobile station activity and the base station communication, and also handles the terminal keyboard input and display output 131. Decisions by the microprocessor controller 130 are made in accordance with received messages and measurements that are made. The keyboard and display unit 131 enable information to be exchanged between the user and the base station.

Figure 5:
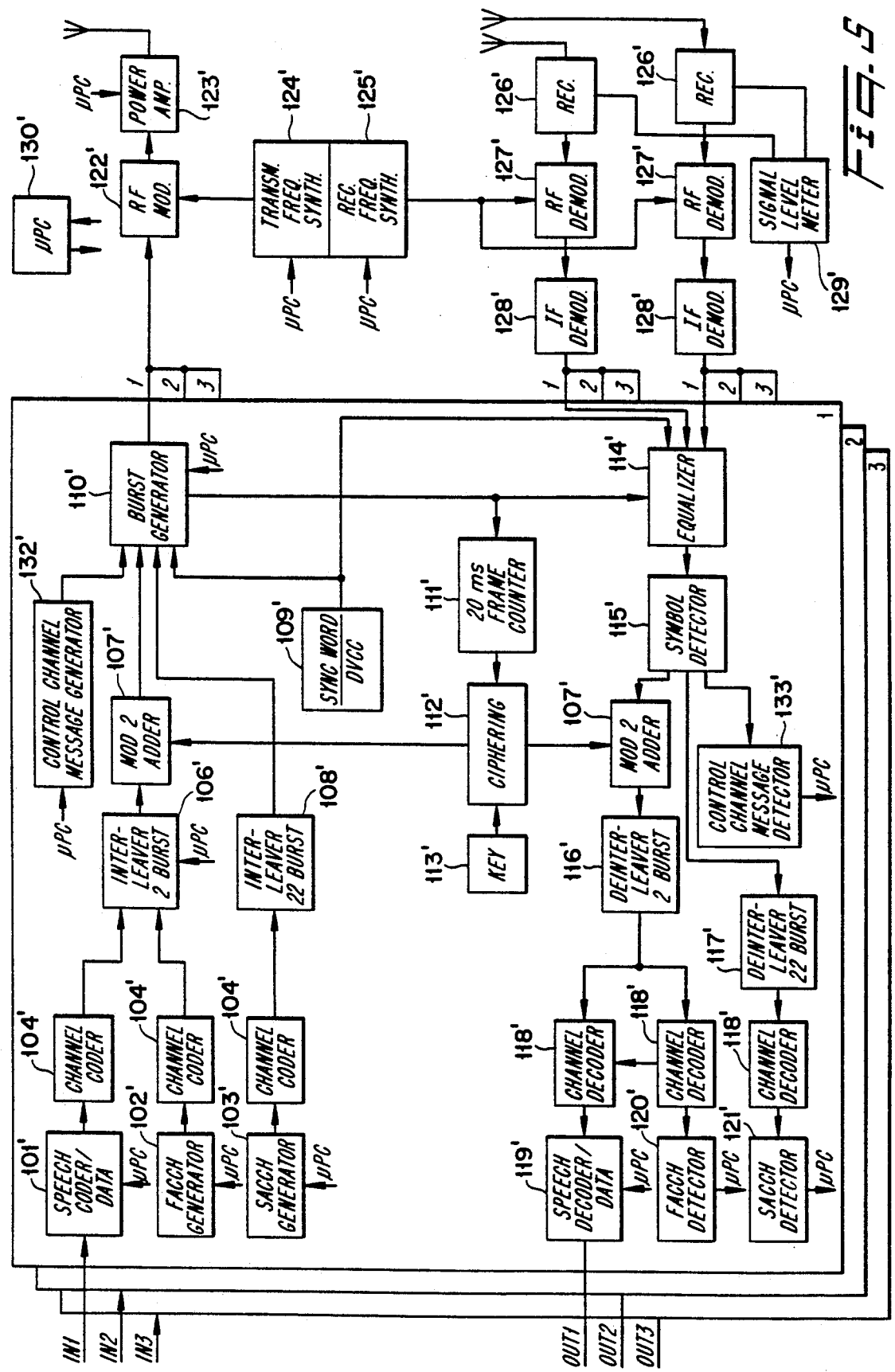
FIG. 5 is a block diagram illustrating a base station in a cellular mobile radio system according to FIG. 1.

FIG. 5 illustrates an embodiment of a base station that can be utilized in a cellular telephone system that operates in accordance with the present invention. The base station incorporates numerous component parts which are substantially identical in construction and function to component parts of the mobile station illustrated in FIG. 4 and described in conjunction therewith. Such identical component parts are designated in FIG. 5 with the same reference numerals utilized hereinabove in the description of the mobile station, but are differentiated therefrom by means of a prime (') designation.

There are, however, some distinctions between the mobile and base stations. For instance, the base station has two receiving antennas. Associated with each of these receiving antennas are a receiver 126', an RF demodulator 127', and an IF demodulator 128'. Furthermore, the base station does not include a user keyboard and display unit 131 as utilized in the mobile station. Finally, there can be a plurality of channels, represented in FIG. 5 by the boxes labeled 1, 2 and 3, with corresponding inputs IN1, IN2, and IN3, and outputs OUT1, OUT2 and OUT3. Although the system is shown here with three channels, the number used would be dependent upon system requirements as determined by the system designers.

When power is applied to the mobile station, the microprocessor controller 130 executes an initialization procedure. Initially, the serving system parameters are retrieved, meaning that the preferred system, e.g., A or B (wireline or non-wireline), is selected. Depending on the choice made, scanning is carried out over the dedicated control channels belonging to the preferred system.

In order to tune the "best" control channel, the mobile station must search through the existing control channels. This is called scanning of control channels. Scanning can be started because the mobile station logic unit automatically inserts the first control channel number into the frequency generator in a known manner. The control channel with the strongest signal strength is chosen by the mobile to receive the call or other transmission.

Figure 6:
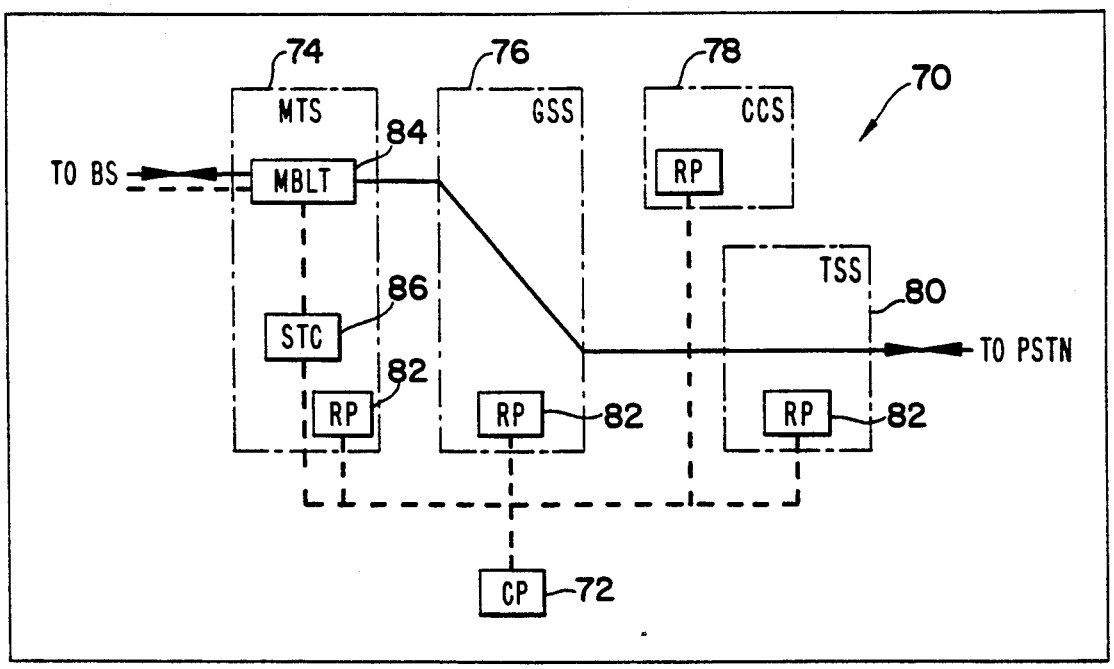
FIG. 6 is a block diagram illustrating a mobile switching center in a cellular mobile radio system according to FIG. 1.

FIG. 6 is a block diagram of an example of a mobile switching center which can be used to implement the method according to the present invention. The mobile switching center shown in FIG. 6 is a simplified block diagram of some of the functional units in a mobile switching center. FIG. 6 shows but one example of a mobile switching center. Other systems may also be used.

The mobile switching center 70 is a highly modular system which includes a central processor 72 and a mobile telephone subsystem 74 for the cellular system which is integrated with the other subsystems. A group switching subsystem 76, a common channel signalling subsystem 78, and a trunk and signalling subsystem 80 are connected to the central processor 72. The mobile telephone subsystem 74 includes a regional processor 82, a mobile telephone base station line terminal 84 and a signalling terminal 86. The remaining subsystems also each include a regional processor 82.

The mobile telephone subsystem 74 handles all specific mobile subscriber functions, cellular network functions, as well as the signalling with the mobile stations. Subsystem 74 also provides the common channel signalling subsystem 78 with the necessary data from the mobile switching center signalling. The operation and maintenance functions specific for the cellular system are also implemented in the mobile telephone subsystem 74. The mobile telephone subsystem 74 includes the mobile telephone base station line terminals 84 which connect the mobile telephone subsystem 74 to the various base stations within the system and to the public switching telephone network. The signalling terminal 86 provided in the mobile telephone subsystem 74 handles data communication between the mobile switching center and the base stations. The regional processor 82 provided in each of the subsystems stores and executes the regional software for the switching system, handling simple, routine and high capacity tasks.

The group switching subsystem 76 is controlled by a traffic control subsystem (not shown). The group switching subsystem 76 sets up, supervises and clears connections through the group switch (not shown). The common channel signalling subsystem 78 contains functions for signalling, routing, supervision and correction of messages sent in accordance with a predetermined standard. The trunk and signalling subsystem 80 supervises the state of the trunk lines to the public switching telephone network and to the other mobile switching centers.

The central processor 72 stores and executes the central processor software for the switching system, handling the more complex functions. These functions include, but are not limited to, job administration, store handling, loading and changing of programs, etc. Further, to the extent that the methods according to the preferred embodiments of the present invention are implemented by software routines operating in the mobile switching center, they are implemented in the central processor 72.

One of the primary tasks performed in the system access mode of the mobile station is the generation of an access message in the mobile station and preparation of a suitable traffic channel for information exchange. The access channels available to the mobile, which were updated during an idle mode, are examined in a manner similar to the measuring of the dedicated control channels as previously described. A ranking of the signal strength of each is made, and the channel associated with the strongest signal is chosen. The transmitting frequency synthesizer 124 and the receiving frequency synthesizer 125 are tuned accordingly, and a service request message is sent over the selected channel in order to inform the base station about the type of access wanted, e.g., call origination, page response, or registration access. After completion of this message, the amplifier 123 of the mobile station is turned off and the mobile station may wait for further control messages. Depending on the access type, the mobile station may then receive a reply message from the base station.

According to a first embodiment of the present invention, a "wait and compare" method is used. This method is most applicable to the setting up of calls, both mobile originated calls and calls directed to mobile stations, although it can be used to process other types of mobile generated transmissions such as registrations. For the purposes of explanation of this embodiment, the following discussion, referring to FIG. 2, relates to an example wherein a mobile station 12 travels from cell C8 to the nearby cell F16. In this example, the intended near base station 10a (at the borders of nearby cells F16, F17 and F18) and the overhearing relatively faraway base station 10c (at the borders of remote cells F16, F17, and F18) are connected to the same mobile switching center.

The "wait and compare" method of the present invention involves waiting until the time has elapsed for all possible mobile generated transmissions originating from one mobile station (in this example 2 requests) to have come to the mobile switching center (i.e., using a time period which is approximated to be the worst-case time required for signalling), and to make a decision then as to which transmission to serve, rejecting all others. This decision is based on the signal strength if the difference therebetween is significant. If this difference is not significant, the determination as to which transmission to use is made based on some other predefined priority order, such as the first transmission to be received. One possible threshold value for the difference could be about 10 dB, but this threshold could be differently specified for each system or each cell or even each cell-cell combination. According to a preferred embodiment, the threshold is between ±10 dB.

According to a preferred embodiment, before the comparison is made, a compensation value is added to each of the received signal strengths (compensation values being an individual cell parameter) to make it possible to change the odds for some cells to win the comparison competition. The value of the compensation parameter could be initially set to 0. It can later be changed if experience, simulations, etc. show that some cells fail in comparisons when they should win. This situation could occur, for example if the faraway base station has very good receiving conditions, e.g., is situated in a high tower on a mountain. The compensation values are determined based on each particular cell-cell combination and can be altered as experience dictates. Of course, instead of adding the compensation value to the individual signal strengths, the compensation could be accomplished after the difference is determined by adding a value to the difference between the signal strengths.

Figure 7:
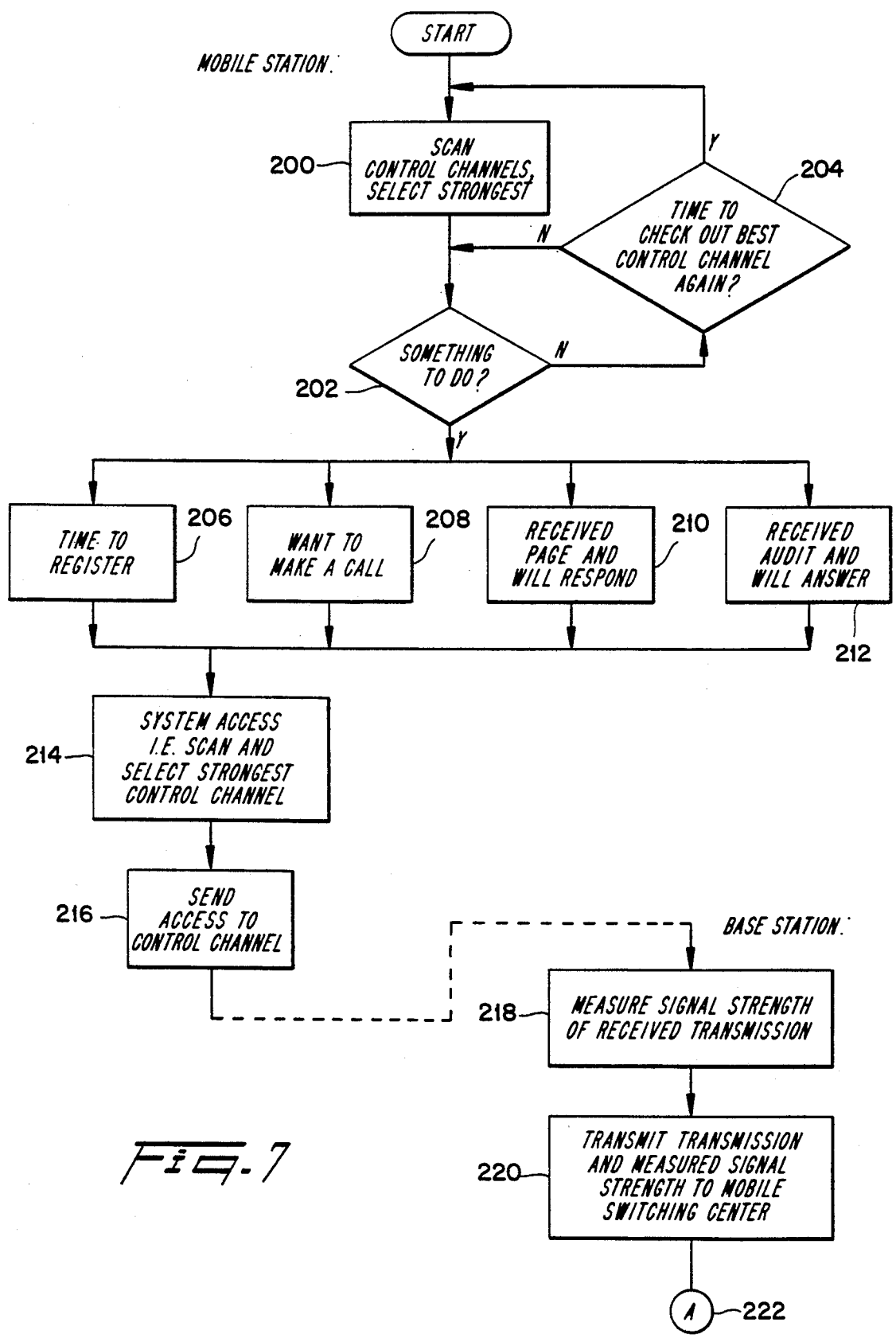
FIG. 7 is a flowchart of a pre-processing stage of the present invention.

The "wait and compare" method will now be described with reference to FIGS. 7 and 8. According to a preferred embodiment, as shown in FIG. 7, the mobile station scans the control channels from nearby base stations and selects the strongest signal strength, at step 200. The mobile station then waits for some control signal over the selected control channel (step 202). If nothing intended for the mobile station is heard, when it is again time to rescan the control channels to determine which is the strongest (step 204), the mobile station returns to step 200.

A number of possible functions are available to the mobile station, some of which are shown in FIG. 7. For example, the mobile may determine: it is time to register (step 206); it wants to make a call (step 208); it has received a page and wants to respond (step 210); or it received an audit message and wants to answer (step 212). Other functions are possible, as is known to technical people working in cellular technology, but are not described herein because they are nor relevant to the present invention.

For each action that will be taken in steps 206-212, the mobile performs a system access by scanning and selecting the strongest control channel at step 214. At step 216, the mobile sends the mobile generated transmission to the selected control channel.

As represented by the dashed line, both the intended base station and any other base stations operating on the same or adjacent frequencies which overhear the mobile generated transmission (called "transmission" in the drawings for simplicity) measure the signal strength of the received mobile generated transmission at step 218. That transmission is then transmitted along with the measured signal strength, to the mobile switching center at step 220. At this point, control is passed to step 300, shown in FIG. 8.

All mobile generated transmissions reported to the mobile switching center with the same mobile station number and/or serial number within the given time period are stored in the mobile switching center at step 300. The identity of the appropriate mobile station and base station or an area associated with the base station, the signal strength of the received signal, and the time of receipt of the mobile generated transmission by the mobile switching center are also stored. At step 302, it is determined whether a compensation value has been stored for the particular cell-cell combination in question. If it has, at step 304, the stored compensation value is added to the stored signal strengths and the sums are stored as the compensated signal strengths.

At step 306, the compensated signal strengths stored for the stored transmissions are compared to one another. At step 308, it is determined whether the difference between the stored signal strengths is below the predetermined threshold or whether only one mobile generated transmission has been received. If the difference is not below the threshold, the mobile generated transmission with the strongest signal strength is taken as the mobile generated transmission received by the intended base station, and is processed by the mobile switching center, at step 312. Mobile generated transmissions which are rejected are processed for statistical purposes and are acknowledged with a negative response being sent to the appropriate base station at step 314.

At very small differences in signal strength between two mobile generated transmissions, i.e., the differences between the signal strength is below the threshold at step 308, and more than one mobile generated transmission is received (step 309) instead of merely selecting the highest signal strength, the mobile generated transmission to be chosen as the correct transmission is determined according to a second priority order, at step 310. In a preferred embodiment, the first mobile generated transmission to be received is processed. Step 311 is executed if only one mobile generated transmission is received (yes, at step 309) so that the only received transmission is processed.

Figure 8:
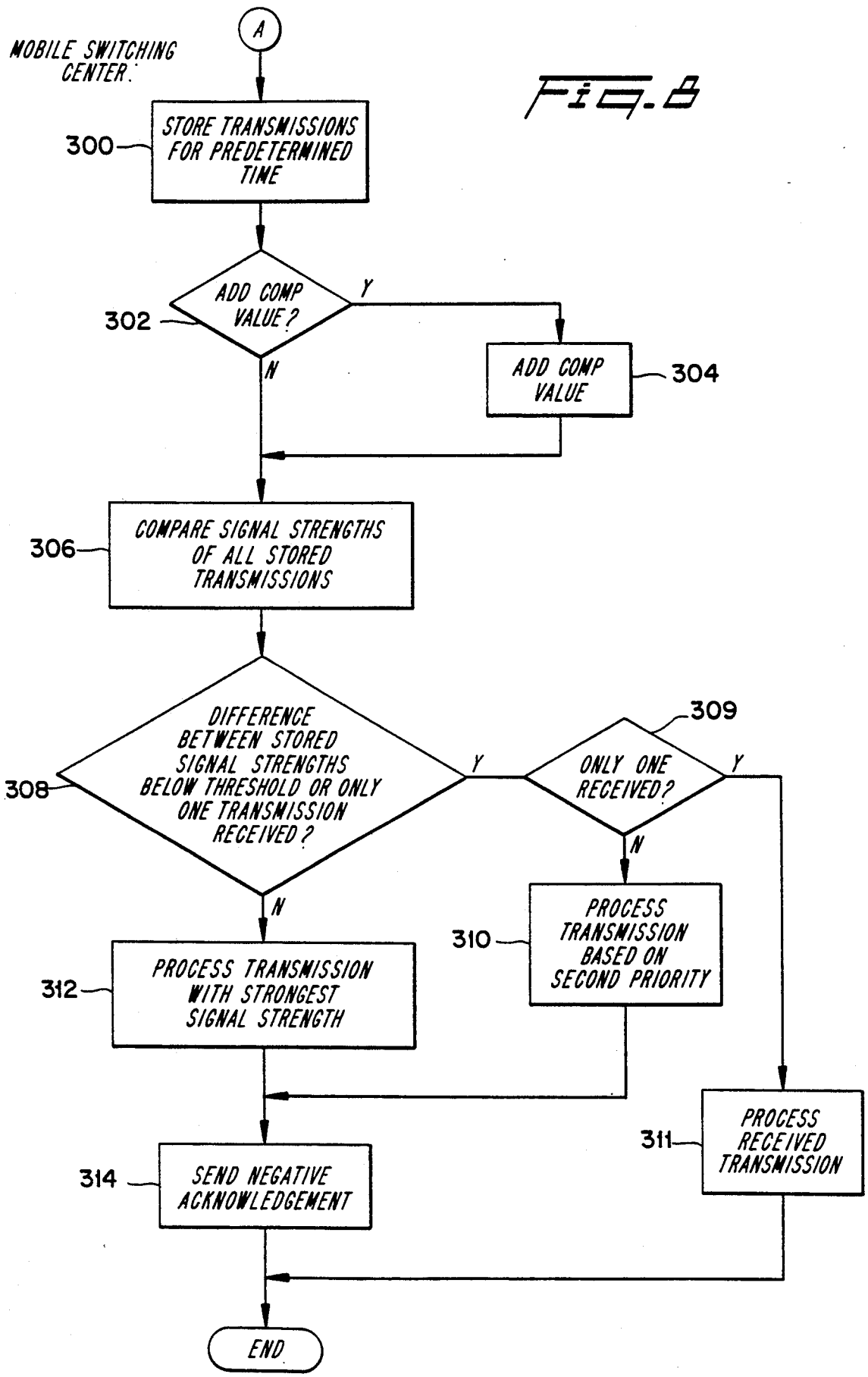
FIG. 8 is a flowchart illustrating a first embodiment of the present invention.

In the embodiment shown in FIGS. 7 and 8, the decision concerning which mobile generated transmission to process is made in the mobile switching center. However, it is also possible that the two (or more) base stations which overhear the mobile generated transmission are connected to different mobile switching centers. In this case, both mobile switching centers may attempt to send the mobile generated transmission to a home location register or home mobile switching center. The home location register or home mobile switching center then makes the decision at to which based station is the intended recipient of the message. In this case, the software routines illustrated in FIG. 8 would be executed in a processor connected to the home location register, either a stand-alone processor or one which also serves as a mobile switching center processor.

The time period of FIG. 8 is measured by a clock. This clock may be for example, an internal clock (not shown) in the mobile switching center or home location register. The time period begins upon the occurrence of the first event, i.e., when the first transmission from a given mobile unit is received, through the base station, by the mobile switching center. The time period during which the transmissions are stored may be in the range of 100 ms or less, depending on, among other things, the signalling used (protocol, transmission speed, load, etc) between the base station and the mobile switching center. If several mobile switching centers are involved, the time period may be in the range of up to about 2 seconds or less, depending on, among other things, the signalling used (protocol, transmission speed, load, etc.) between the mobile switching centers.

According to another embodiment of the present invention, a "store and compare" method is used. This method is most applicable to the registering of a mobile unit in a new cell, although it can be used for processing other mobile generated transmissions, such as access requests or paging responses. Referring to FIG. 2, the following discussion relates to an example where the mobile unit travels from cell C8 to the nearby cell F16. Also, though this is not necessary, the location (or area) border passes between these two cells. The mobile unit recognizes the need to register when reading the SID (the digital system identification associated with a cellular system; each system being assigned a unique number) or the REGID (the registration identification) in the overhead message train (in cellular systems), and makes an access for registration. The access is reported to the respective mobile switching center by the nearby F16 base station 10a and by the faraway F16 base station 10c, connected to the same mobile switching center. It is assumed that all mobile generated transmissions received by the mobile switching center within a predetermined time after the first received transmission relate to the same request, overheard by more than one base station.

Figure 9:
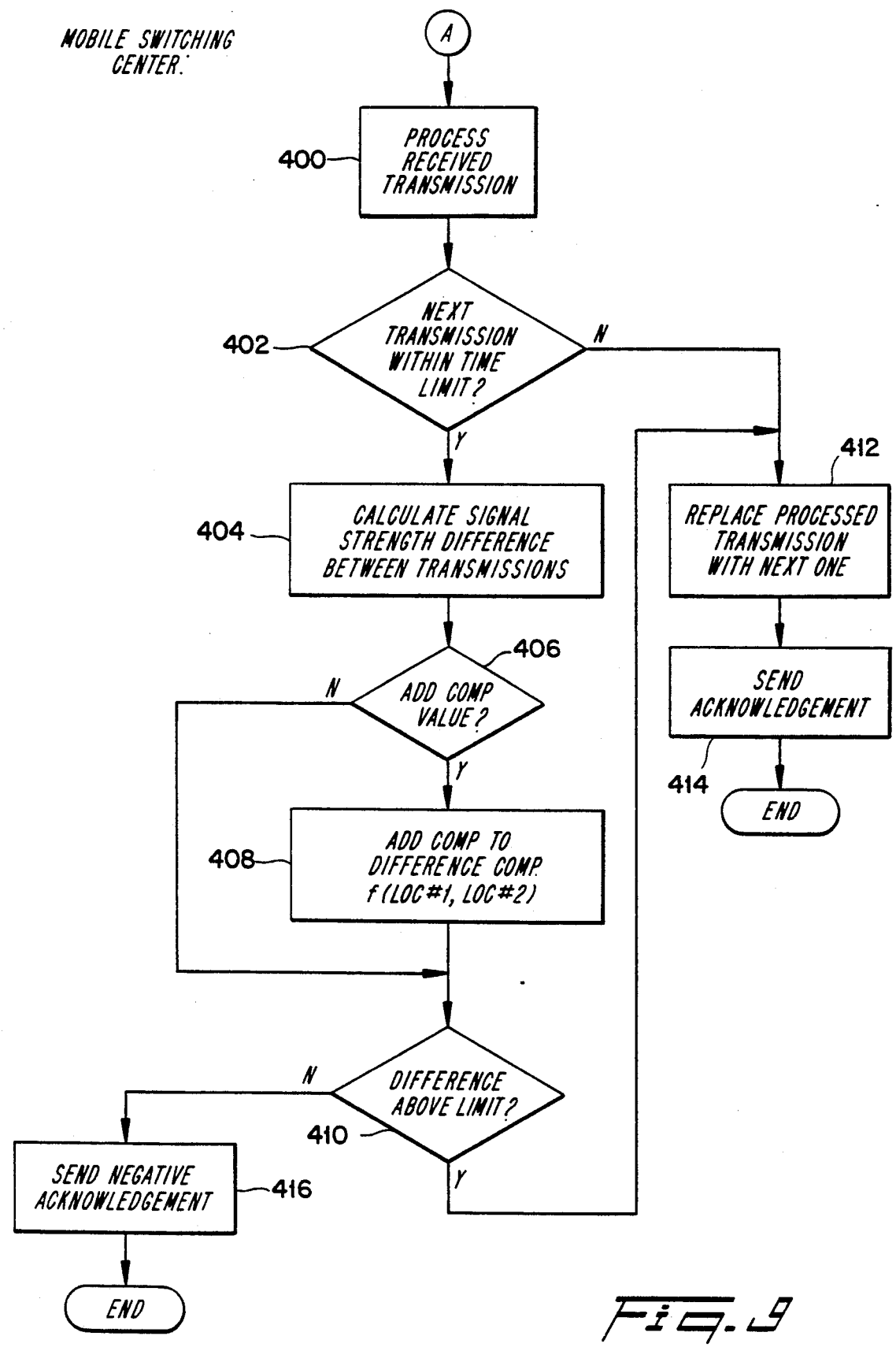
FIG. 9 is a flowchart illustrating a second embodiment of the present invention.

The "store and compare" method will now be described with reference to FIGS. 7 and 9. The processing carried out by the mobile station engaged in registration and by the receiving base stations is the same as shown in FIG. 7 and described above with respect to the "wait and compare" method. However, once control passes to the mobile switching center, the mobile switching center record the first incoming mobile generated transmission together with the signal strength measured by the nearby base station 10a during the access at step 400 of FIG. 9. When the next mobile generated transmission arrives, it is first determined whether the next transmission arrived within a specified time limit at step 402. The time used for the specified time limit is typically less than 2 seconds, as discussed above with respect to the "wait and compare" method. With other possible system configurations, the time limit may range up to about 10 seconds or more.

If the transmission is within the time limit, the signal strength measured by the faraway F16 base station 10c is compared to the previously recorded signal strength to calculate a difference therebetween (step 404). At step 406, it is determined whether a compensation value has been stored for the particular cell-cell combination involved. If so, the compensation value is added to the difference at step 408, where the compensation value is a function of the respective locations of the two cells which have received the transmissions. Of course, compensation values may be added to the signal strengths themselves, before the difference is calculated, as described above with respect to FIG. 8.

It is determined at step 410 whether the difference between the two signal strengths is above a specified limit. If the difference is above the limit, that is, the difference is significant, the previously received mobile generated transmission is replaced by the new transmission at step 412. Further, if the next transmission is not within the specified time limit at step 402, the new transmission is processed at step 412. In either case, the base station is then informed of the outcome of the mobile generated transmission processing (step 414).

When the signal strengths of two reports of the same mobile generated transmission regarding a registration do not differ significantly, for example, less than 10 dB, and one report is from the base station with the old registration, no new registration is made and a negative acknowledgement is sent (step 416).

In an application of this second embodiment to call set-up, the mobile switching center acts on the first access that it receives, and stores the identification of the mobile and base stations, the signal strength of the access request and the time it was received. If another access from the same mobile station number and/or serial number is received within a short time from the first access, a comparison is made between the accesses, after the aforementioned compensation value has been added to the received signal strength. If the second access is lower in signal strength, it is rejected. Otherwise, it is acted upon, replacing the first access. The processing of the first base station's access in the case of a second higher signal strength will be terminated. A negative acknowledgement may also be sent to the mobile station via the base station in question. Successive mobile station accesses within a short time frame from the first access will be likewise compared relative to their signal strength. Upon rejection of an access, a negative acknowledgement signal may be sent back to the mobile station via the base station in question and may be counted for statistical purposes.

As discussed above with respect to the "wait and compare" method, the overhearing base stations may be assigned to different mobile switching centers. In this case, the processing of FIG. 9 can occur in a home location register or a home mobile switching center to which both mobile switching centers are connected.

Figure 10:
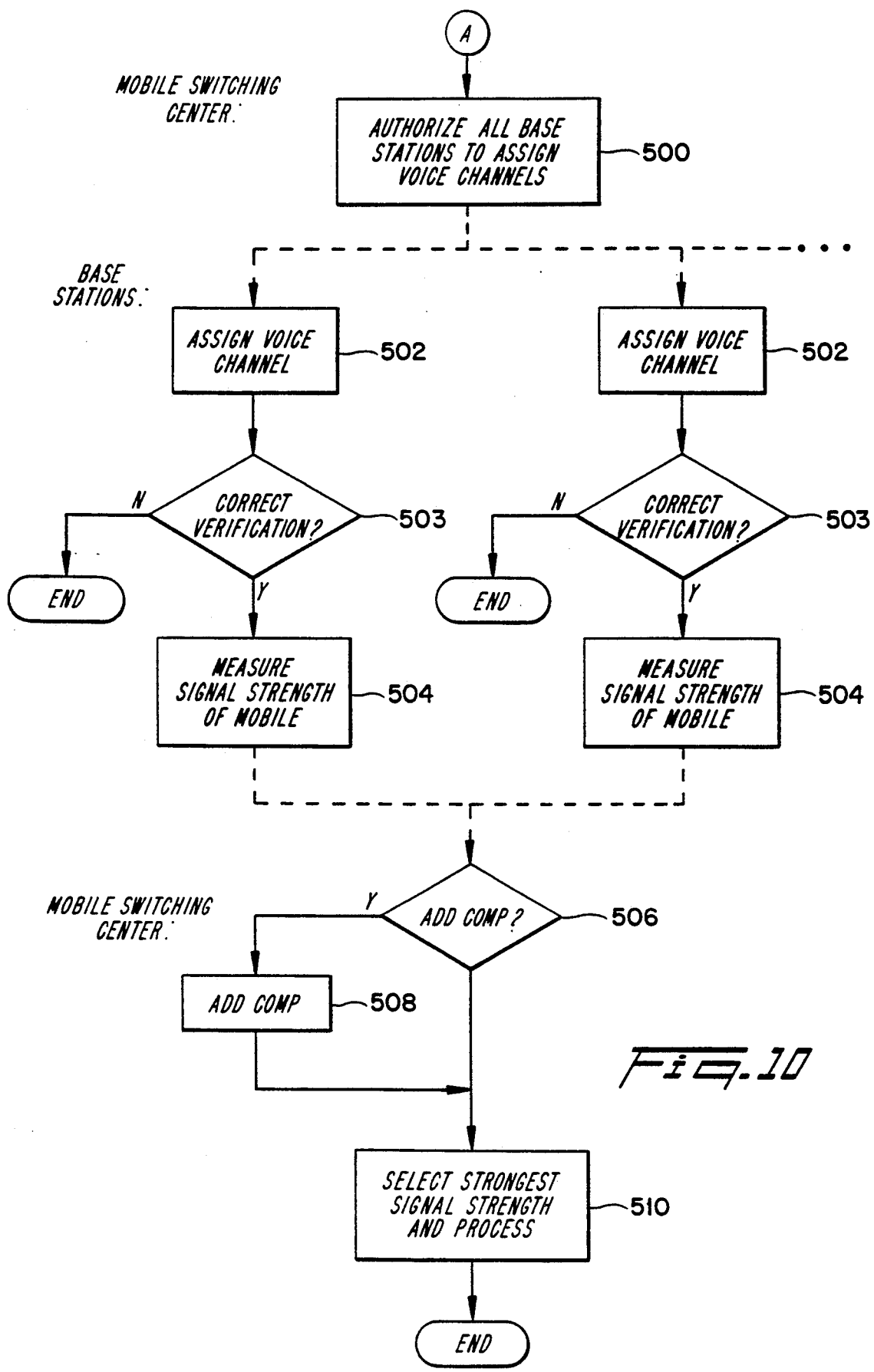
FIG. 10 is a flowchart illustrating a third embodiment of the present invention.

Another embodiment of the present invention, illustrated in the flowcharts of FIGS. 7 and 10, the "competing stations" method, is most applicable to the setting up of calls, although it may be used to process other types of mobile generated transmissions. When two base stations report a mobile generated transmission to the mobile switching center or to two respective mobile switching centers, it is not appropriate to automatically serve the first received transmission and to reject later reports, as discussed above. But instead of deciding the issue of which of several transmission to accept, it is possible to authorize the assignment of voice/traffic channels in all base stations having reported the transmission. Then a decision is made by the mobile unit of which voice/traffic channel to connect and acknowledge, based on the stronger voice channel assignment message from the nearby base station.

This method would be used according to a preferred embodiment to solve the problem that occurs, for example, when three base stations 10a, 10b, and 10c (each associated with cell F16 in FIG. 2) receive a mobile generated transmission from mobile station 12. All base stations assign a voice channel and send a request to the mobile station to tune to the assigned voice channel. In this example, all three cells use the same frequency and identification code—digital color code (DCC). The voice channels chosen need not use the same frequency, nor do they have to have the same supervisory audio tone (SAT) identification. The SAT is a continuous tone added to the transmitted speech by the voice channel unit in the base station, received by the mobile station and returned to the base station.

The mobile station 12 will only hear the order from nearby base station 10a, which is much stronger than the signals from faraway base stations 10b and 10c. No one will listen for the orders sent by base stations 10b and 10c, hence the voice channels assigned in these base stations will most often not detect any mobile stations tuning to their voice channels, i.e., will not detect a correct SAT or other verification signal such as a digital channel code (DVCC).

Of course, a situation may arise that the voice channels chosen by base stations 10b and/or 10c have the same frequency and SAT as that chosen by base station 10a. Additionally, any voice channel can occasionally receive interference on the voice channel, where the interference has the expected SAT.

In this case, all cells think that the mobile station responded because of their voice channel assignment, and therefore, the mobile switching center or home location register cannot accurately determine in which cell the mobile is located, and hence does not know which base station to use for the call. In such a case, the beginning procedure is the same as that shown in FIG. 7 and described above. After the transmission and measured signal strength is transmitted to the mobile switching center or home location register at step 220, control passes to the mobile switching center or home location register, as shown in FIG. 10. At step 500, the mobile switching center or home location register authorizes all base stations from which it receives a transmission originating from the same mobile station within a predetermined time interval to assign a voice channel to the requesting mobile. The time interval is determined in the same manner as for the two preceding embodiments. Control then passes to the base stations, as represented by the dashed lines leading to steps 502. In a preferred embodiment, steps 502 through 504 are performed in the base stations authorized by the mobile switching center or home location register to assign a voice channel. However, it is also possible that step 502 be performed by the mobile switching center or home location register. The voice channel assignments along with the verification signal, such as a SAT or DVCC, are transmitted to the requesting mobile. The base station, when it receives a response back from the mobile station, determines whether the correct verification signal, i.e., the same verification signal that was originally transmitted to the mobile station, is detected on the voice channel (step 503). For each base station, if the correct verification signal is not detected on the voice channel, the routine in that base station ends. If the correct SAT is detected, the base station then measures the signal strength of the signal from the mobile station on the voice channel (step 504).

Control is then passed back to the mobile switching center as represented by the dashed lines, and if a compensation value is stored for the respective base stations (step 506), the compensation value is added to the signal strengths (step 508). Although not shown, the compensation value may be added to the difference between the signal strengths, rather than to the signal strength values themselves. At step 510, the strongest or second strongest signal strength is identified and the call is connected through and acknowledged to the associated base station.

It is possible to combine the "wait and store" and the "competing stations" methods so that the selection is primarily performed by the mobile unit, but the mobile switching center may contribute to the selection process by rejecting a faraway base station.

It is understood that mobile station access refers to any type of system access a mobile station may make when contacting a base station. Although the invention has been described with reference to a system including a mobile switching center, this is not intended to be limited to such applications. If no mobile switching center is present, the process described above for determining which of several accesses is correct would be carried out in the base stations. Likewise, the process could be modified to accommodate more than one mobile switching center as may occur in systems such as that shown in FIG. 3 and discussed above.

It is possible that a Home Location Register database (HLR) can be used to determine to which base station various mobiles are assigned. In this case, the inventive "store and compare" method for treating registrations, i.e., non-call related accesses, may also be performed using the HLR.

It is understood that the methods of the present invention can be used in a cellular mobile radio system which transmits analog signals, digital signals, or a combination of both.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology of terminology employed herein is for the purpose of description and not of limitation.

What is claimed is:

1. A method of operating a cellular system, wherein a mobile station transmits a mobile generated transmission which is received by at least two base stations, said method comprising the steps of:
   measuring the signal strength of the received mobile generated transmission;
   sending the mobile generated transmission and the measured signal strength of the mobile generated transmission to a processing means from the at least two base stations;
   storing in a memory the respective mobile generated transmissions and measured signal strengths received from the at least two base stations within a predetermined time period; and
   determining which of the mobile generated transmissions to accept based on time of receipt by the processing means and the stored signal strengths of the mobile generated transmissions, wherein the step of determining comprises the steps of:
   comparing signal strengths to yield a difference value;
   if the difference value is greater than or equal to a predetermined threshold, accepting the mobile generated transmission having the strongest relative signal strength; and
   if the difference value is below the predetermined threshold, accepting one of the received mobile generated transmissions according to a predetermined priority order.

2. The method of claim 1, wherein the step of determining further comprises the step of:
   adding a stored compensation value to each of the measured signal strengths received from the at least two base stations to determine compensated signal strengths, the compensation value being stored relative to each pair of base stations of the at least two base stations;
   wherein the step of comparing comprises comparing the compensated signal strengths to yield the difference value.

3. The method of claim 2, further comprising after the step of determining, the step of processing the accepted mobile generated transmission.

4. The method of claim 1, further comprising after the step of determining, the step of processing the accepted mobile generated transmission.

5. A method of operating a cellular system, wherein a mobile station transmits a mobile generated transmission which is received by at least two base stations, said method comprising the steps of:
   measuring the signal strength of the received mobile generated transmission;
   sending the mobile generated transmission and the measured signal strength of the mobile generated transmission to a processing means from the at least two base stations;
   processing a first received mobile generated transmission from one of the at least two base stations, the processing comprising the steps of:
   storing in a memory the respective mobile generated transmissions and measured signal strengths received from the at least two base stations within a predetermined time period, wherein the step of storing comprises storing the received mobile generated transmission and the identity of the mobile station, the signal strength, and the time of receipt of the mobile generated transmission by the processing means; and
   determining which of the mobile generated transmissions to accept based on time of receipt by the processing means and the stored signal strengths of the mobile generated transmissions, wherein the step of determining comprises the steps of:
   comparing the signal strength of a subsequent mobile generated transmission received from a second one of the at least two base stations within the predetermined time period with the stored transmission signal strength and determining a difference value;
   if the difference value is greater than or equal to a predetermined threshold and the signal strength of the subsequent transmission is greater than the stored signal strength, then terminating the processing of the processed mobile generated transmission, and storing the identity of the mobile station, signal strength, and time of receipt of the subsequent mobile generated transmission.

6. The method of claim 5, further comprising, after the step of comparing, the step of adding a compensation value to the difference value based on which two of the at least two base stations have sent the first received mobile generated transmission and the subsequent mobile generated transmission to yield a compensated difference value and wherein the compensated difference value is used as the difference value.

7. The method of claim 6, further comprising, after the step of determining, repeating the previous steps for subsequent mobile generated transmissions received from the same mobile station or a different base station as the stored transmission for the predetermined time period.

8. The method of claim 6, further comprising the step of, if the difference value is below the predetermined threshold, accepting one of the received mobile generated transmissions according to a predefined priority order.

9. The method of claim 5, further comprising, after the step of determining, repeating the previous steps for subsequent mobile generated transmissions received from the same mobile station as the stored transmission for the predetermined time period.

10. The method of claim 5, further comprising the step of, if the difference value is below the predetermined threshold, accepting one of the received mobile generated transmissions according to a predefined priority order.

11. A method of operating a cellular system, wherein a mobile station transmits a mobile generated transmission which is received by at least two base stations, said method comprising the steps of:
   processing the mobile generated transmission received first from one of the base stations;
   storing the identification of the base station from which the processed mobile generated transmission originated and the signal strength of the processed mobile generated transmission;
   comparing the signal strength of a subsequent mobile generated transmission received from another base station to the signal strength of the processed mobile generated transmission to yield a difference value;
   obtaining a compensated difference value by adding, to the difference value, a compensation value stored relative to the base stations from which the processed mobile generated transmission and the subsequent mobile generated transmission are received;
   when the compensated difference value is greater than or equal to a predetermined threshold amount, terminating the processed mobile generated transmission, processing the subsequent mobile generated transmission having the greater signal strength, and storing the identification of the base station from which the subsequent processed mobile generated transmission originated and the signal strength of the subsequent processed mobile generated transmission; and
   repeating the comparing, terminating and subsequent processing and storing steps for further mobile generated transmissions received during a set time period.

12. The method of claim 11, wherein the step of terminating the processed mobile generated transmission comprises the step of sending a negative acknowledgement to the base station from which the terminated processed mobile generated transmission was received.

13. A method for use in a cellular radio telephone system for determining which mobile generated transmission, received by a processing means from at least two base stations receiving a single mobile generated transmission, should be accepted by the processing means, the method comprising the steps of:
   (a) in the mobile station;
      (1) scanning a plurality of control channels over which messages are broadcast by a plurality of base stations to determine relative signal strengths of the messages;
      (2) sending a mobile generated transmission over a selected one of said plurality of control channels, the mobile generated transmission being received by the at least two base stations;
   (b) in the at least two base stations;
      (1) measuring the signal strength of the received mobile generated transmission;
      (2) sending the mobile generated transmission and the measured signal strength of the received mobile generated transmission to the processing means;
   (c) in the processing method;
      (1) storing in a memory the respective mobile generated transmissions and measured signal strengths received from the at least two base stations within a predetermined period of time; and
      (2) determining which of the received mobile generated transmissions to accept based on the time of receipt in the processing means and the relative signal strengths of the mobile generated transmissions, and wherein the step of determining comprises the steps of:
   comparing the signal strengths of the stored transmissions to yield a difference value;
   if the difference value is greater than or equal to a predetermined threshold, accepting the mobile generated transmission having the highest relative signal strength; and
   if the difference value is below the predetermined threshold, accepting one of the received mobile generated transmissions according to a predetermined priority order.

14. The method of claim 13, wherein the step of determining comprises the step of:
   adding a stored compensation value to each of the measured signal strengths received from the at least two base stations to determine compensated signal strengths, the compensation value being stored relative to each pair of base stations of the at least two base stations;
   wherein the step of comparing comprises comparing the compensated signal strengths to yield the difference value.

15. The method of claim 14, further comprising after the step of determining, the step of processing the accepted mobile generated transmission.

16. The method of claim 13, wherein the mobile generated transmission is of a type selected from one of the following: an access request for originating a call, a registration request, a paging response and an audit response.

17. The method of claim 13, further comprising after the step of determining, the step of processing the accepted mobile generated transmission.

18. A method for use in a cellular radio telephone system for determining which mobile generated transmission, received by a processing means from at least two base stations receiving a single mobile generated transmission, should be accepted by the processing means, the method comprising the steps of:
   (a) in the mobile station:
      (1) scanning a plurality of control channels over which messages are broadcast by a plurality of base stations to determine relative signal strengths of the messages;
      (2) sending a mobile generated transmission over a selected one of said plurality of control channels, the mobile generated transmission being received by the at least two base stations;
   (b) in the at least two base stations:
      (1) measuring the signal strength of the received mobile generated transmission;

(2) sending the mobile generated transmission and the measured signal strength of the received mobile generated transmission to the processing means;

(c) in the processing means:
(1) processing a first received mobile generated transmission from one of the at least two base stations, the processing comprising the steps of:
  (i) storing in a memory the respective mobile generated transmission and measured signal strengths received from the at least two base stations within the predetermined period of time, the step of storing comprising storing the received mobile generated transmission and the identity of the mobile station, the signal strength, and the time of receipt of the mobile generated transmission by the processing means; and
  (ii) determining which of the received mobile generated transmissions to accept based on the time of receipt in the processing means and the relative signal strengths of the mobile generated transmissions;
wherein the step of determining comprises the steps of:
comparing the signal strength of a subsequent mobile generated transmission received from a second one of the at least two base stations within the predetermined time period with the stored transmission signal strength and determining a difference value;
if the difference value is greater than or equal to a predetermined threshold and the signal strength of the subsequent transmission is greater than the stored signal strength, then terminating the processing of the processed mobile generated transmission, and storing the identity of the mobile station, signal strength, and time of receipt of the subsequent mobile generated transmission.

19. The method of claim 18, further comprising, after the step of comparing, the step of adding a compensation value to the difference value based on which two of the at least two base stations have sent the first received mobile generated transmission and the subsequent mobile generated transmission to yield a compensated difference value and wherein the compensated difference value is used as the difference value.

20. The method of claim 19, further comprising the step of, if the difference value is below the predetermined threshold, accepting one of the received mobile generated transmissions according to a predefined priority order.

21. The method of claim 19, further comprising, after the step of determining, repeating the previous steps for subsequent mobile generated transmissions received from the same mobile station as the stored transmission for the predetermined time period.

22. The method of claim 18, further comprising, after the step of determining, repeating the previous steps for subsequent mobile generated transmissions received from the same mobile station or a different base station as the stored transmission for the predetermined time period.

23. The method of claim 22, further comprising, after the step of terminating, the step of sending a negative acknowledgement to the base station from which the terminated transmission was received.

24. The method of claim 18, further comprising, after the step of terminating, the step of sending a negative acknowledgement to the base station from which the terminated transmission was received.

25. The method of claim 18, further comprising the step of, if the difference value is below the predetermined threshold, accepting one of the received mobile generated transmissions according to a predefined priority order.

26. A method for use in a cellular radio telephone system for determining which mobile generated transmission, received by processing means from at least two base stations receiving a single mobile generated transmission, should be accepted by the processing means, said method comprising the steps of:

(a) in the mobile station:
(1) scanning a plurality of control channels over which messages are broadcast by a plurality of base stations to determine relative signal strengths of the messages;
(2) sending a mobile generated transmission over a selected one of said plurality of control channels, said mobile generated transmission being received by the at least two base stations;

(b) in the at least two base stations:
(1) measuring the signal strength of the received mobile generated transmission;
(2) sending the mobile generated transmission and the measured signal strength of the received mobile generated transmission to the processing means;

(c) in the processing means;
(1) authorizing the at least two base stations from which mobile generated transmissions are received initiated by the same mobile station within a predetermined time interval to assign a voice channel to the mobile station;

(d) in the at least two base stations:
(1) assigning a voice channel to the mobile station and transmitting a verification signal to the mobile station;
(2) receiving a signal from the mobile station on the assigned voice channel, the signal comprising a verification signal;
(3) if the verification signal on the assigned voice channel is the same as that transmitted to the mobile station, measuring the signal strength of the signal received from the mobile station on the assigned voice channel and transmitting the signal and the signal strength thereof to the processing means;

(e) in the processing means:
(1) adding a compensation value to the signal strength of the received signals, based on which two of the at least two base stations have transmitted; and
(2) accepting the mobile generated transmission from the base station whose signal on the voice channel has the strongest or second strongest compensated signal strength.

27. A system for processing multiple mobile generated transmissions in a cellular system, said cellular system having at least one mobile unit, at least two base stations and at least one processing means, said system comprising:
means, provided in said mobile unit, for scanning signals transmitted by such base stations on at least one base to mobile control channel and selecting one of said base stations for access;

means, provided in said mobile unit, for transmitting said mobile generated transmissions over a control channel of the selected base station;

means, provided in said at least two base stations, for receiving said transmitted mobile generated transmission and for sending said received mobile generated transmissions to said processing means; and means, provided in said processing means, for selecting one of several mobile generated transmissions received from at least two base stations for processing based on the time of receipt of the mobile generated transmission and the relative signal strength of the mobile to base signal associated with the mobile generated transmissions, said means comprising:

memory means for storing the mobile generated transmissions which occur within a predetermined time period, identities of the mobile stations sending the mobile generated transmissions, signal strength of the mobile generated transmissions measured at the time of receipt of the mobile generated transmission by the respective base stations;

means for measuring the signal strengths of the mobile generated transmissions;

first comparing means for comparing the stored signal strengths of the transmissions to yield a difference value;

second comparing means for comparing the difference value to a predetermined threshold;

wherein said means for selecting is responsive to said second comparing means to select a mobile generated transmission having the strongest relative signal strength when the difference value is greater than or equal to the predetermined threshold and accept another one of the received mobile generated transmissions according to a predetermined priority order when the difference value is below the predetermined threshold.

28. The system of claim 27, wherein said means provided in said processing means further comprises:

means for storing a compensation value relating to at least one pair of base stations in said cellular system; and means for adding a stored compensation value, corresponding to the base stations sending the mobile generated transmissions to the processing means, to the stored signal strengths of the mobile generated transmissions.

* * * * *